(12) United States Patent
Kalisz et al.

(10) Patent No.: US 8,414,024 B1
(45) Date of Patent: Apr. 9, 2013

(54) BLOW-MOLDED ACTIVE SIDE BOLSTER WITH TEAR TABS

(75) Inventors: Raymond E. Kalisz, Livonia, MI (US); Michael G. Orlowsky, Sterling Heights, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 58 days.

(21) Appl. No.: 13/274,709

(22) Filed: Oct. 17, 2011

(51) Int. Cl.
*B60R 21/04* (2006.01)

(52) U.S. Cl. .................. 280/753; 280/730.1; 280/730.2; 280/748; 296/187.05

(58) Field of Classification Search .............. 280/728.1, 280/748, 750–753, 730.1, 730.2; 296/187.05, 296/187.06, 187.12
See application file for complete search history.

(56) References Cited

U.S. PATENT DOCUMENTS

| | | | |
|---|---|---|---|
| 5,571,355 A | 11/1996 | Kornylo | |
| 6,817,627 B2 * | 11/2004 | Galmiche et al. | 280/730.1 |
| 7,108,312 B2 | 9/2006 | Cowelchuk et al. | |
| 7,572,401 B2 | 8/2009 | Cowelchuk et al. | |
| 7,980,589 B2 | 7/2011 | Best et al. | |
| 8,205,909 B2 * | 6/2012 | Kalisz | 280/752 |
| 8,308,186 B1 * | 11/2012 | Orlowsky et al. | 280/728.2 |
| 8,328,230 B1 * | 12/2012 | Kalisz | 280/730.1 |
| 8,336,910 B1 * | 12/2012 | Kalisz et al. | 280/730.1 |
| 2009/0152849 A1 | 6/2009 | Saraf et al. | |
| 2011/0115201 A1 | 5/2011 | Best et al. | |
| 2011/0133435 A1 * | 6/2011 | Sadr et al. | 280/730.1 |
| 2011/0272926 A1 * | 11/2011 | Roychoudhury et al. | 280/728.2 |
| 2011/0316300 A1 * | 12/2011 | Kalisz | 296/37.12 |
| 2012/0112439 A1 * | 5/2012 | Roychoudhury | 280/728.3 |
| 2012/0248741 A1 * | 10/2012 | Kalisz | 280/728.2 |
| 2013/0015647 A1 * | 1/2013 | Kalisz et al. | 280/743.2 |

OTHER PUBLICATIONS

Raj S. Roychoudjury, et al., Blow-Molded Plastic Active Knee Bolsters, SAE Technical Paper Series 2004-01-0844, Mar. 8-11, 2004.

* cited by examiner

*Primary Examiner* — Ruth Ilan
(74) *Attorney, Agent, or Firm* — Vichit Chea; MacMillian, Sobanski & Todd, LLC

(57) ABSTRACT

An active bolster for a door of a transportation vehicle comprises a sheet metal door frame with a plurality of brackets. A door cover panel is mounted to the door frame. The cover panel has a bolster aperture, a living hinge disposed around the perimeter of the bolster aperture, and a plurality of mounting bosses. A blow-molded bladder is arranged to fit within the bolster aperture having a front surface substantially coplanar with the cover panel, having a pleated back surface, and having a plurality of side mounting tabs extending laterally from the sides of the bladder. Each side mounting tab is attached to a respective mounting boss and includes a respective tear seam configured to pull away from the respective mounting boss during inflation of the bladder. A plurality of capture pins are insert molded into the back surface. Each pin is captured by a respective bracket.

8 Claims, 3 Drawing Sheets

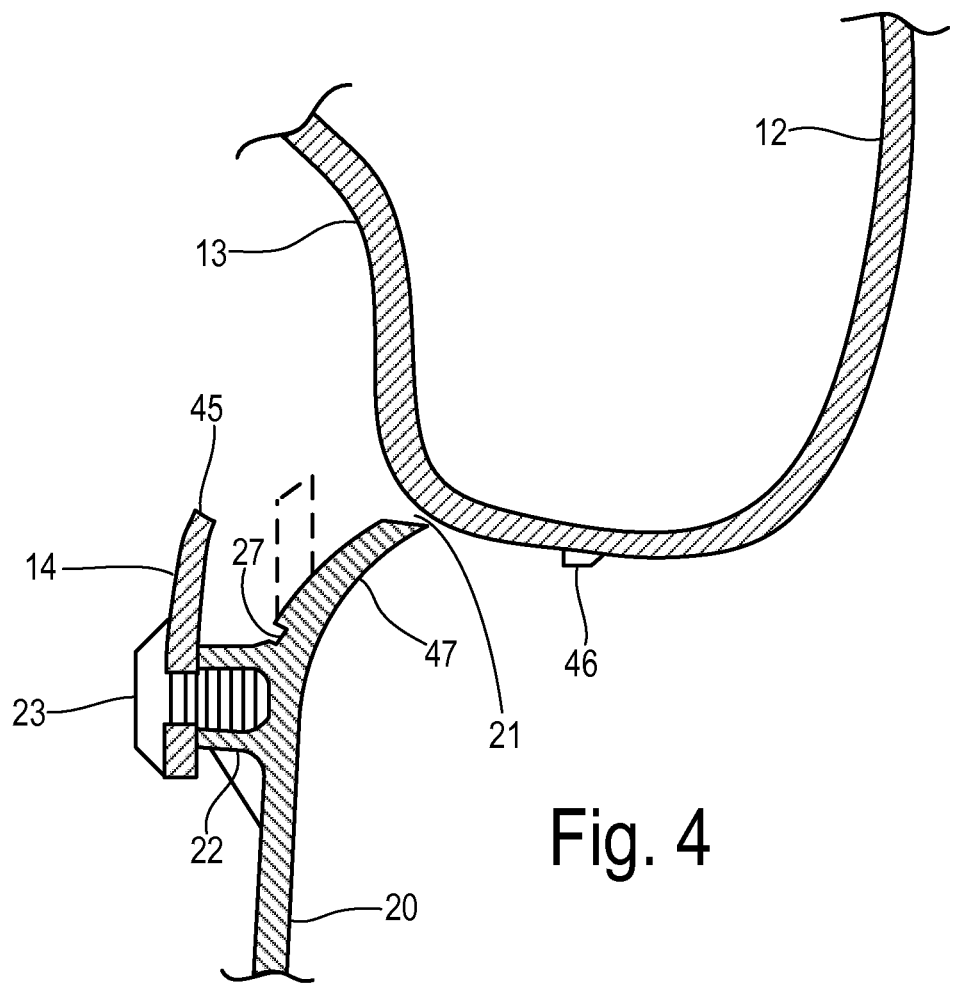

BLOW-MOLDED ACTIVE SIDE BOLSTER WITH TEAR TABS

CROSS REFERENCE TO RELATED APPLICATIONS

Not Applicable.

STATEMENT REGARDING FEDERALLY SPONSORED RESEARCH

Not Applicable.

BACKGROUND OF THE INVENTION

The present invention relates in general to active bolsters for passenger vehicles, and, more specifically, to an active bolster and mounting system incorporated in a side door of a vehicle.

In order to reduce loads applied to an occupant from impact during a vehicle crash, active bolster systems are sometimes installed within a vehicle interior. They may be located in an instrument panel or glove box door to protect the knees or in a door panel, window pillar, or seat structures to protect against side impacts. A typical active bolster is formed from a plastic bladder shaped into a bellows or pleated configuration on one surface. Upon the occurrence of a crash event of sufficient magnitude, an inflator is activated to inflate the bolster and expand the bladder to create an impact cushion.

An active bolster assembly must be mounted in a way that ensures a proper orientation and support during a deployment (i.e., expansion) toward the occupant. The mounting should ensure that it deploys without any obstructions or misalignments that could degrade its trajectory or performance, and should not produce forces that would dislodge the trim panel from its own mounting to an underlying structural element. Moreover, the appearance of the bolster itself and its fit within surrounding trim elements must meet craftsmanship specifications such as gap size, gap consistency, and flushness.

A bolster assembly is typically mounted to an underlying fixed structural element of the vehicle in order to support the bolster against expansion and to receive the forces applied against the bolster during impact with an occupant. In the case of an active side impact system, the bolster may be mounted to a door frame. A door trim substrate or cover panel is also mounted to the door frame to provide the interior surface of the door. The trim substrate panel includes an opening for receiving the bolster, and the bolster has an outer surface with a desired color and texture to match the trim panel.

An active bolster assembly typically includes a rigid backplate or housing member containing the bladder that acts as a reaction surface during expansion of the bladder. The backplate for a door side bolster may be attached to the door frame as is typically done or may be independently supported by the trim panel itself as disclosed in copending application U.S. Ser. No. 13/251,652, filed Oct. 3, 2011, entitled "Active Bolster with Integrated Tear Seam." The backplate takes up space within the interior of the door, where available space can already be severely limited by styling surfaces or the presence of other components. It would be desirable to eliminate the backplate to make more efficient use of the interior space of the door and to reduce cost and weight of an active bolster assembly, while maintaining good fit and finish of the bolster.

SUMMARY OF THE INVENTION

In one aspect of the invention, an active bolster is provided for a door of a transportation vehicle comprising a sheet metal door frame with a plurality of brackets. A door cover panel is mounted to the door frame. The cover panel has a bolster aperture, a living hinge disposed around the perimeter of the bolster aperture, and a plurality of mounting bosses disposed around the perimeter of the bolster aperture. A blow-molded bladder is arranged to fit within the bolster aperture having a Class A front surface substantially co-planar with the cover panel, having a pleated Class B back surface, and having a plurality of side mounting tabs extending laterally from the sides of the bladder. Each side mounting tab is attached to a respective mounting boss and includes a respective tear seam configured to pull away from the respective mounting boss during inflation of the bladder. A plurality of capture pins are insert molded into the back surface. Each pin is captured by a respective bracket.

BRIEF DESCRIPTION OF THE DRAWINGS

FIG. 4 is a partial cross-sectional view of the active bolster after inflation.

DETAILED DESCRIPTION OF PREFERRED EMBODIMENTS

Figure 1:
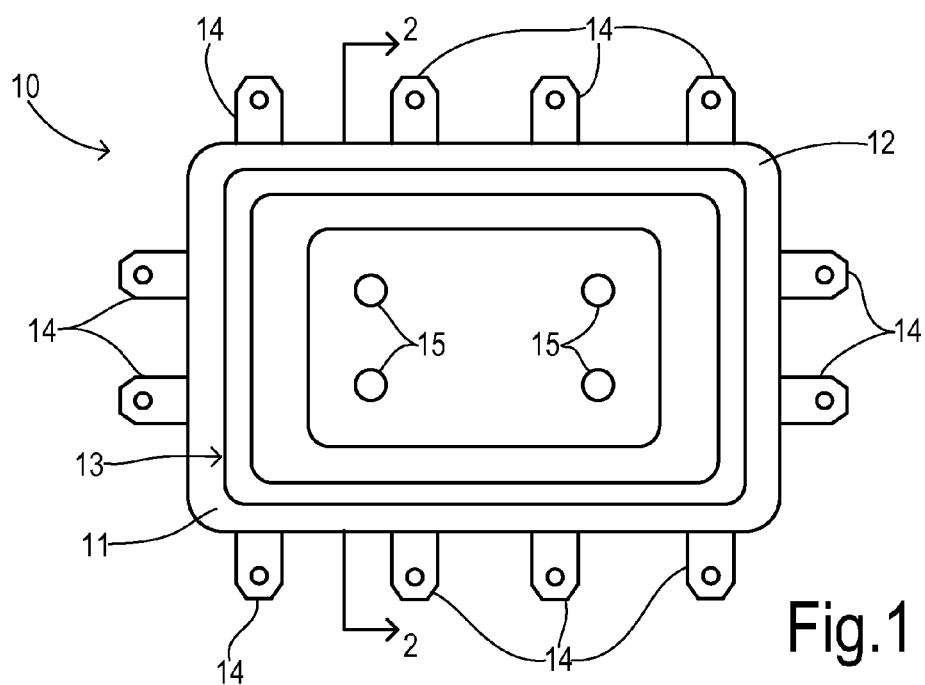
FIG. 1 is a back view of one embodiment of an active bolster of the present invention.

Referring to FIG. 1, a blow-molded bladder 10 has a Class B back surface 11 opposite a Class A front surface 12. Back surface 11 has a bellows such as a plurality of pleats 13 to provide expansion of bladder 10 in response to an inflation gas from an inflator (not shown) under control of a vehicle safety system. Bladder 10 is preferably blow-molded from a flexible plastic material such as polyethylene, polyolefin, or PVC. A plurality of side mounting tabs 14 extend laterally from the sides of bladder 10 intermediate between back surface 11 and front surface 12. Each tab 14 may preferably include a central hole or other features for joining with the back of a door trim panel as described below. A plurality of capture pins 15 are preferably insert molded into back surface 11 for joining to a sheet metal door frame as also described below.

Figure 2:
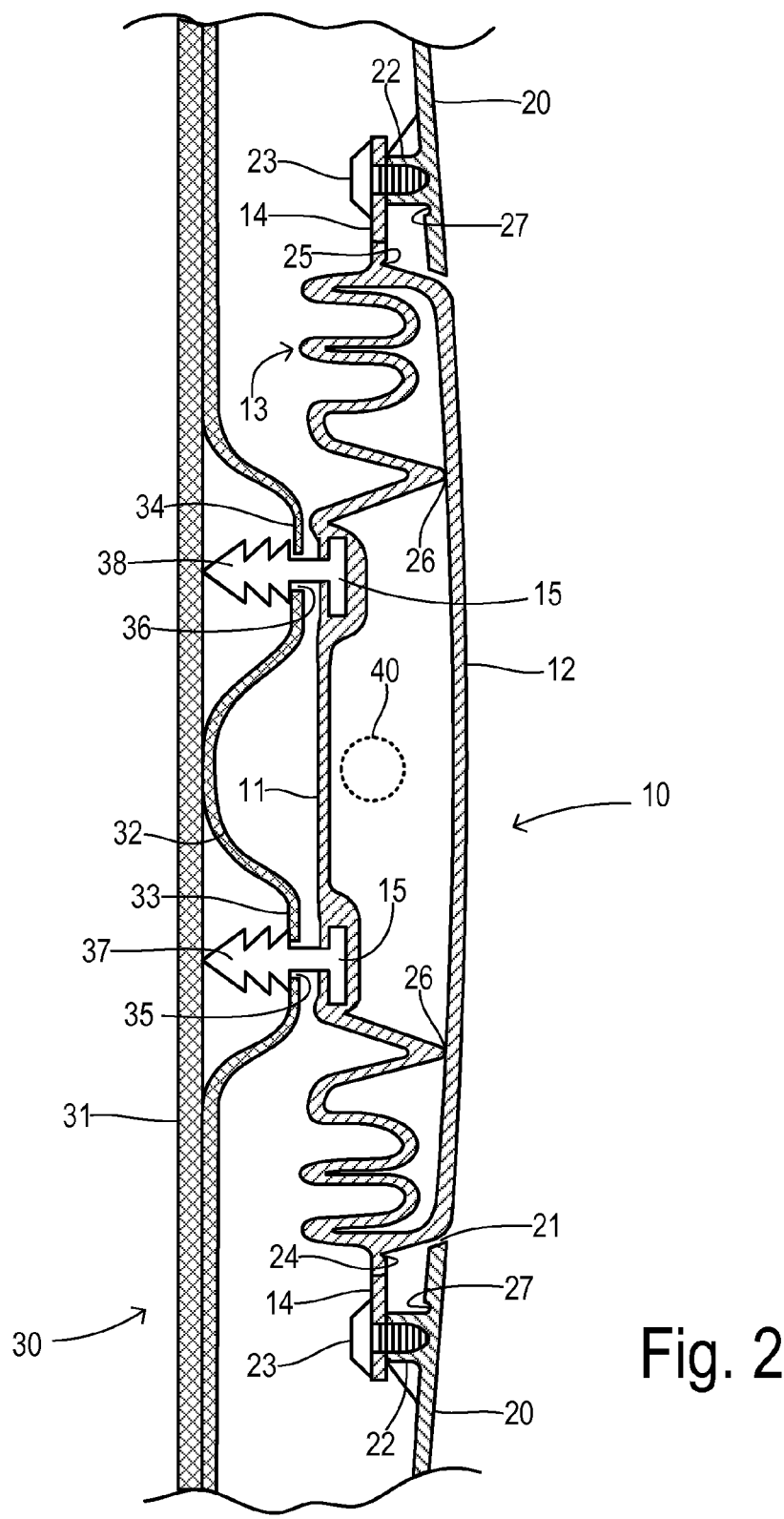
FIG. 2 is a cross-sectional view of the active bolster taken along line 2-2 of FIG. 1 after assembly with a door frame and a door trim panel.

Referring to FIG. 2, bladder 10 is shown mounted to a door cover panel 20 and a sheet metal door frame 30. Class A front surface 12 is substantially co-planar with Class A surface of cover panel 20 and is received within an aperture 21. Mounting bosses 22 are disposed on a Class B side of cover panel 20 around the perimeter of aperture 21. Bosses 22 align with side mounting tabs 14 and receive respective screw fasteners 23. Mounting tabs 14 are connected to the sides of bladder 10 via respective tear seams such as a tear seam 24 and a tear seam 25. Tear seams 24 and 25 may be thinned notches or grooves across the base of each mounting tab 14 to pre-weaken them. The pre-weakening provides sufficient strength to firmly hold bladder 10 in place prior to inflation, but is also sufficiently weak to allow tearing and separation under the forces generated by an inflation gas from an inflator 40. One or more of pleats 13 have a frangible connection to the inner face of front surface 12 as shown at 26, which may be comprised of a plastic weld, adhesive bonds, or other known attachments. Connections 26 prevent the oil-canning effect that might otherwise become apparent on the front surface of bladder 10 prior to inflation.

A living hinge 27 is formed in cover panel 20 disposed around the perimeter of bolster aperture 21. Living hinge 27 is invisible from the outside Class A front surface of cover panel 20 prior to inflation. Living hinge 27 is a thinned groove spaced from aperture 21 to allow the edge of aperture 21 to deflect or bend in order to accommodate the outward expansion of bladder 10.

Door frame 30 may be comprised of first sheet metal panel 31 joined with a second sheet metal member 32. Member 32 is shaped to form a plurality of hat brackets 33 and 34 extending away from panel 31. Member 32 may be spot welded or otherwise attached to sheet metal panel 31 in any conventional manner. Brackets 33 and 34 have respective holes 35 and 36 that receive respective capture pins 15 that are preferably insert molded to and extending from back surface 11. Snap lock features 37 and 38 on pins 15 are deformable to allow easy insertion through holes 35 and 36 to hold bolster 10 against door frame 30, thereby providing a reaction surface to support inflation. Snap lock features 37 and 38 are weak enough to enable easy removal in order to allow servicing (e.g., removal of bladder 10).

Figure 3:
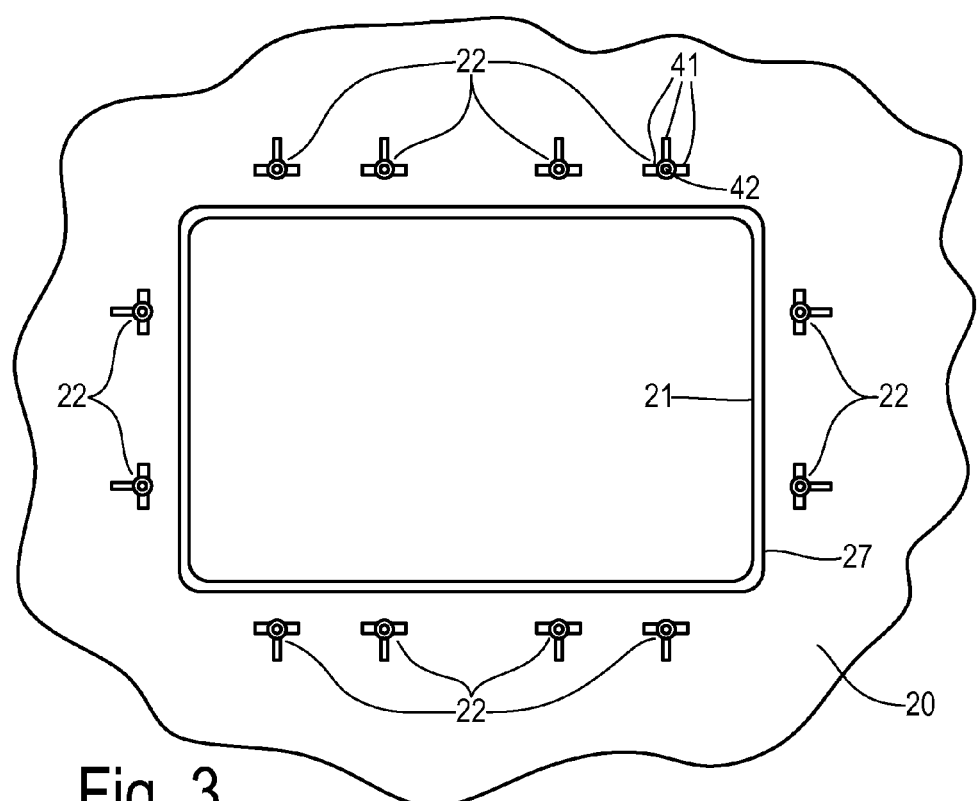
FIG. 3 is a back view of the door trim panel of FIG. 2.

FIG. 3 shows the Class B back surface of cover panel 20 in greater detail. A plurality of mounting bosses 22 disposed around the parameter of bolster aperture 21 have respective support walls 41 and a central bore 42 for receiving respective screws that pass through the respective mounting tabs. Living hinge 27 preferably extends around the entire perimeter of bolster aperture 21, but other acceptable configurations will be apparent to those skilled in the art.

FIG. 4 shows bolster 10 after being deployed by an inflation gas to expand pleats 13 and front surface 12. The tear seam previously joining side mounting tab 14 with the main body of the bladder has torn along separated edges 45 and 46. Inflation of the bladder has deflected the edge of aperture 21 by bending along living hinge 27 to a deformed position 47. Thus, an active side bolster has been provided with good fit and finish within an aperture in the door cover panel while retaining the bladder against the door frame as a reaction surface which also retains the bolster in the appropriate location for cushioning an occupant. By eliminating a back plate, attachments for the back plate along with its manufacturing costs and assembly costs are eliminated. By screwing or heat staking the bladder to the door cover panel, excellent fit and finish is obtained. By blow-molding the bladder, an attractive appearance is easily obtained on the Class A front surface of the bladder. In addition, various coatings or wrapping of the Class A front surface may also be employed.

What is claimed is:

1. An active bolster for a door of a transportation vehicle, comprising:
a sheet metal door frame including a plurality of brackets;
a door cover panel mounted to the door frame, the cover panel having a bolster aperture, a living hinge disposed around the perimeter of the bolster aperture, and a plurality of mounting bosses disposed around the perimeter of the bolster aperture;
a blow-molded bladder arranged to fit within the bolster aperture having a Class A front surface substantially co-planar with the cover panel, having a pleated Class B back surface, and having a plurality of side mounting tabs extending laterally from the sides of the bladder, each side mounting tab attached to a respective mounting boss and including a respective tear seam configured to pull away from the respective mounting boss during inflation of the bladder; and
a plurality of capture pins insert molded into the back surface, each captured by a respective bracket.

2. The active bolster of claim 1 wherein the brackets are comprised of hat brackets each having a respective hole receiving a respective capture pin.

3. The active bolster of claim 1 wherein each bracket includes a respective hole receiving a respective capture pin, and wherein each capture pin includes a snap-lock feature for locking the capture pin in the respective hole.

4. The active bolster of claim 1 wherein the mounting bosses each includes a screw receptacle, the active bolster further comprising a plurality of screws joining the side mounting tabs to respective mounting bosses.

5. The active bolster of claim 1 wherein the cover panel is comprised of a molded plastic material, and wherein the living hinge is comprised of a thinned groove spaced from the bolster aperture.

6. The active bolster of claim 1 further comprising:
an inflator coupled to the bladder for providing an inflation gas to expand the bladder, wherein the door frame acts as a reaction surface during expansion of the bladder to force the expansion through the bolster aperture, and wherein the expanding bladder deflects the living hinge as it expands.

7. The active bolster of claim 1 wherein the bolster further includes frangible attachments between the pleats and an inner face of the Class A front surface.

8. A bolster comprising:
a door frame with spaced brackets;
a door panel having an aperture surrounded by a living hinge and a plurality of bosses;
a bladder having a front side substantially co-planar with the door panel, a pleated back side, and a plurality of side tabs attached to a respective boss, each tab joined to the bladder by a respective tear seam; and
a plurality of pins joining the back surface to respective brackets.

* * * * *